United States Patent
Fujita et al.

(12) 
(10) Patent No.: US 6,576,733 B1
(45) Date of Patent: *Jun. 10, 2003

(54) CURABLE OXYPROPYLENE POLYMER COMPOSITION

(75) Inventors: Masayuki Fujita, Hyogo (JP); Michihide Homma, Hyogo (JP); Hiroshi Wakabayashi, Hyogo (JP)

(73) Assignee: Kanegafuchi Chemical Industry Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/821,714

(22) Filed: Mar. 20, 1997

Related U.S. Application Data

(63) Continuation of application No. 08/625,988, filed on Apr. 1, 1996, now abandoned, which is a continuation of application No. 08/408,322, filed on Mar. 21, 1995, now abandoned, which is a continuation of application No. 08/195,599, filed on Feb. 14, 1994, now abandoned, which is a continuation of application No. 07/768,972, filed as application No. PCT/JP91/00326 on Mar. 11, 1991, now abandoned.

(30) Foreign Application Priority Data

Mar. 9, 1990 (JP) .............................................. 2-58856

(51) Int. Cl.$^7$ ................................................ C08G 77/08
(52) U.S. Cl. ............................... 528/18; 508/21; 508/34
(58) Field of Search .............................. 528/18, 21, 34

(56) References Cited

U.S. PATENT DOCUMENTS

| | | | | |
|---|---|---|---|---|
| 3,971,751 A | * | 7/1976 | Isayama et al. | ........... 260/37 R |
| 4,507,469 A | * | 3/1985 | Mita et al. | ................... 528/425 |
| 4,837,401 A | * | 6/1989 | Hirose et al. | ................ 525/364 |
| 4,904,745 A | * | 2/1990 | Inoue et al. | ................. 525/404 |
| 6,369,187 B1 | * | 4/2002 | Fujita et al. | ................... 528/29 |

FOREIGN PATENT DOCUMENTS

| | | |
|---|---|---|
| JP | 61-197631 | 9/1986 |
| JP | 61-215623 | 9/1986 |
| JP | 1-279970 | 11/1989 |

* cited by examiner

*Primary Examiner*—Margaret G. Moore
(74) *Attorney, Agent, or Firm*—Jordan and Hamburg LLP

(57) ABSTRACT

This invention provides a curable composition capable of giving cured products drastically improved in resilience. This composition includes (A) an oxypropylene polymer having at least one silicon atom-containing group with a hydroxyl group or a hydrolyzable group bound to the silicon atom and having an Mw/Mn ratio of not more than 1.6 and a number average molecular weight of not less than 6,000, (B) an organic carboxylic acid salt of divalent tin and (C) an organic amine compound.

11 Claims, No Drawings

CURABLE OXYPROPYLENE POLYMER COMPOSITION

This application is a continuation of application Ser. No. 08/625,988, filed Apr. 1, 1996, now abandoned, which is a continuation of application Ser. No. 08/408,322, filed Mar. 21, 1995, now abandoned, which is a continuation of application Ser. No. 08/195,599, filed Feb. 14, 1994, now abandoned, which is a continuation of application Ser. No. 07/768,972, filed Nov. 6, 1991, now abandoned which is a 371 of PCT/JP91/00326 filed Mar. 11, 1991.

BACKGROUND OF THE INVENTION

This invention relates to a novel curable composition which comprises a reactive silicon group-containing oxypropylene polymer, an organic carboxylic acid salt of divalent tin, and an organic amine compound.

Oxypropylene polymers containing a reactive silicon group (a group which is a silicon atom-containing group with a hydroxyl group or a hydrolyzable group being bound to the silicon atom and can form a siloxane bond) can occur as liquid polymers and, upon exposure to moisture, etc., harden to give rubber-like cured substances at room temperature. Therefore these polymers are used as elastic sealants and the like for buildings. In using these polymers, they may be used in the form of compositions containing an organic carboxylic acid salt of divalent tin and an organic amine compound, which serve as curing catalysts, so that the cured products can be improved in resilience (Japanese Kokai Patent Publication No. 55-9669). The term "resilience" as used herein means the rate of recovery after 24 hours of the size of a test piece from a cured product as determined by compressing the test piece by 20%, for instance, then keeping the same in an atmosphere maintained at 40° C. in that compressed state for 24 hours and thereafter relieving the last piece from the compression. It is necessary that the resilience should be high.

The present inventors made investigations in a search for curable compositions containing a reactive silicon group-containing oxypropylene polymer and having further improved resilience and, as a result, found that resilience can be improved when the oxypropylene polymer has a narrower molecular weight distribution. This finding has now led to the present invention.

SUMMARY OF THE INVENTION

The curable composition according to the invention comprises:

(A) an oxypropylene polymer which contains, in its main polymer chain, a repeating unit of the formula

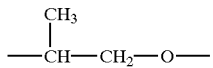

and which has at least one silicon atom-containing group (reactive silicon group) with a hydroxyl group or a hydrolyzable group being bound to the silicon atom and has an Mw/Mn (weight average molecular weight/number average molecular weight) ratio of not more than 1.6 and a number average molecular weight (Mn) of not less than 6,000, (B) an organic carboxylic acid salt of divalent tin, and (C) an organic amine compound.

DESCRIPTION OF THE PREFERRED EMBODIMENTS

The reactive silicon group contained in the oxypropylene polymer, namely component (A), to be used in the practice of the invention is not limited to any particular species but may typically include, for example, groups of the following general formula (1)

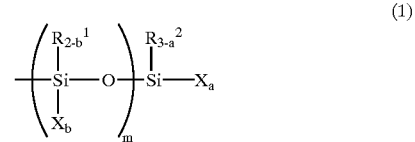

In the above formula, $R_1$ and $R^2$ each is an alkyl group containing 1 to 20 carbon atoms, an aryl group containing 6 to 20 carbon atoms, an aralkyl group containing 7 to 20 carbon atoms or a triorganosiloxy group of the formula $(R')_3SiO-$. Where there are two or more $R^1$ or $R^2$ groups, they may be the same or different. R' is a monovalent hydrocarbon group containing 1 to 20 carbon atoms. The three R' groups may be the same or different. X is a hydroxyl group or a hydrolyzable group and, where there are two or more X groups, they may be the same or different. The number a is 0, 1, 2 or 3 and b is 0, 1 or 2. The number b may vary in the m groups of the formula

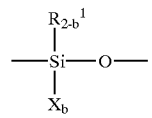

m is an integer of 0 to 19. The following condition shall be satisfied: $a+\Sigma b \geq 1$.

The hydrolyzable group represented by the above-mentioned X is not particularly limited but may be any hydrolyzable group known in the art. More specifically, there may be mentioned a hydrogen atom, a halogen atom, an alkoxy group, an acyloxy group, a ketoximato group, an amino group, an amido group, an acid amido group, an aminoxy group, a mercapto group, an alkenyloxy group and the like. Among these, the hydrogen atom and alkoxy, acyloxy, ketoximato, amino, amido, aminoxy, mercapto and alkenyloxy groups are preferred. From the viewpoint of mild hydrolyzability and easy handling, alkoxy groups, for example methoxy, are particularly preferred.

One to three such hydrolyzable groups or hydroxyl groups may be bound to one silicon atom, and $(a+\Sigma b)$ is preferably equal to 1 to 5. Where there are two or more hydrolyzable groups or hydroxyl groups in the reactive silicon group, they may be the same or different.

The reactive silicon group may contain one silicon atom or two or more silicon atoms. In the case of a reactive silicon group comprising silicon atoms linked to one another via a siloxane bonding or the like, the group may contain about 20 silicon atoms.

Reactive silicon groups of the following general formula (2) are preferred because of ready availability.

In the above formula, $R^2$, X and a are as defined above.

Specific examples of $R^1$ and $R^2$ appearing in the general formula (1) given hereinabove include, among others, alkyl groups, such as methyl and ethyl, cycloalkyl groups, such as cyclohexyl, aryl groups, such as phenyl, aralkyl groups, such as benzyl, and triorganosiloxy groups of the formula (R')

$_3$SiO— in which R' is methyl or phenyl. The methyl group is particularly preferred as R$^1$, R$^2$ and/or R'.

The oxypropylene polymer should recommendably contain at least one, preferably 1.1 to 5 reactive silicon groups per molecule thereof. When the number of reactive silicon groups contained in the polymer on a per-molecule basis is less than 1, the curability becomes inadequate and good rubber elastic behavior can hardly be developed.

The reactive silicon group may be positioned terminally or internally to the molecular chain of the oxypropylene polymer. When the reactive silicon group occurs terminally to the molecular chain, the oxypropylene polymer component contained in the finally formed cured product can have an increased number of effective network chains and therefore a rubber-like cured product showing high strength, high elongation and low elasticity can readily be obtained.

The oxypropylene polymer, which constitutes the main polymer chain in the component (A) to be used in the practice of the invention, contains a repeating unit of the formula

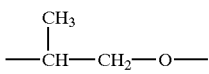

This oxypropylene polymer may be straight-chained or branched, or a mixture of these. It may further contain another monomer unit or the like. It is preferable, however, that the polymer contains the monomer unit represented by the above formula in an amount of at least 50% by weight, more preferably at least 80% by weight.

The oxypropylene polymer that can effectively be used has a number average molecular weight (Mn) of not less than 6,000, preferably 6,000 to 30,000. Furthermore, in this oxypropylene polymer, the weight average molecular weight/number average molecular weight ratio (Mw/Mn) is not more than 1.6, hence the molecular weight distribution is very narrow (the polymer is highly monodisperse). The value of Mw/Mn should preferably be not higher than 1.5, more preferably not higher than 1.4. The molecular weight distribution can be measured by various methods. Generally, however, the measurement method most commonly used is gel permeation chromatography (GPC). Since the molecular weight distribution is narrow in that manner despite the great number average molecular weight, the curable composition of the invention has a low viscosity before curing, hence is easy to handle and, after curing, shows a good rubber elastic behavior.

The reactive silicon group-containing oxypropylene polymer to be used as component (A) in the practice of the invention is preferably prepared by introducing a reactive silicon group into an oxypropylene polymer having a functional group.

Oxypropylene polymers having a high molecular weight with a narrow molecular weight distribution and having a functional group can hardly be obtained by the conventional method of polymerizing oxypropylene (anionic polymerization using a caustic alkali) or by the chain extension reaction method using oxypropylene polymers obtained by the conventional method as starting materials. They can be obtained, however, by such special polymerization methods as those described in Japanese Kokai Patent Publications Nos. 61-197631, 61-215622, 61-215623 and 61-218632 and Japanese Patent Publications Nos. 46-27250 and 59-15336 and elsewhere. Since introduction of a reactive silicon group tends to result in a broadened molecular weight distribution as compared with that before introduction, the molecular weight distribution of the polymer before introduction should preferably be as narrow as possible.

The reactive silicon group introduction can be carried out by any appropriate known method. Thus, for example, the following methods may be mentioned.

(1) An oxypropylene polymer having a terminal functional group, for example a hydroxyl group, is reacted with an organic compound having an active group or an unsaturated group reactive with the functional group and then the resulting reaction product is hydrosilylated by treatment with a hydrosilane having a hydrolyzable group.

(2) An oxypropylene polymer having a terminal functional group (hereinafter referred to as functional group Y), such as a hydroxyl, epoxy or isocyanato group, is reacted with a compound having a functional group (hereinafter referred to as functional group Y') reactive with functional group Y and a reactive silicon group.

Typical examples of the silicon compound having the functional group Y' include, but are not limited to, amino group-containing silanes, such as γ-(2-amino-ethyl) aminopropyltrimethoxysilane, γ-(2-aminoethyl)-aminopropylmethyldimethoxysilane and γ-aminopropyltriethoxysilane; mercapto group-containing silanes, such as γ-mercaptopropyltrimethoxysilane and γ-mercaptopropylmethyldimethoxysilane; epoxysilanes, such as γ-glycidoxypropyltrimethoxysilane and β-(3,4-epoxy cyclohexyl) ethyltrimethoxysilane; vinyl type unsaturated group-containing silanes, such as vinyltriethozysilane, β-methacryloyloxypropyltrimethoxysilane and γ-acryloyloxypropylmethyldimethoxysilane; chlorine atom-containing silanes, such as γ-chloropropyltrimethoxysilane; isocyanato-containing silanes, such as γ-isocyanatopropyltriethoxysilane and γ-isocyanatopropylmethyldimethoxysilane; and hydrosilanes, such as methyldimethoxysilane, trimethoxysilane and methyldiethoxysilane.

Among the methods mentioned above, the method (1), and the method (2) comprising the reaction between a polymer having a terminal hydroxyl group and a compound having an isocyanato group and a reactive silicon group are preferred.

As examples of the organic carboxylic acid salt of divalent tin which is to be used as component (B) in accordance with the invention, there may be mentioned, among others, tin(II) octanoate, tin(II) naphthenate and tin(II) stearate.

This organic carboxylic acid salt of divalent tin is used preferably in an amount of about 0.001 to 10 parts (parts by weight; hereinafter the same shall apply) per 100 parts of the reactive silicon group-containing oxypropylene polymer.

As examples of the organic amine compound to be used as component (C) in the practice of the invention, there may be mentioned, among others, diethylenetriamine, triethylenetetramine, tetraethylenepentamine, butylamine, hexylamine, octylamine, decylamine, laurylamine, hexamethylenediamine, triethanolamine, dibutylamine, diethanolamine, N,N,N',N'-tetramethyl-1,3-butanediamine, benzylamine, cyclohexylamine, dodecamethylenediamine, dimethylethylenediamine, dimethylaminoethanol, N,N,N', N'-tetramethylethylenediamine, triethylamine, N,N-dimethylaniline and dimethylbenzylaniline.

The organic amine compound is used preferably in an amount of about 0.001 to 10 parts per 100 parts of the reactive silicon group-containing oxypropylene polymer.

These component (B) organic carboxylic acid salts of divalent tin and component (C) organic amine compounds may respectively be used either singly or in combination as a mixture of two or more of them.

If necessary, a filler, a plasticizer and/or the like may be incorporated into the curable composition of the invention.

Examples of the filler include reinforcing fillers such as fumed silica, precipitated silica, silicic anhydride, hydrous silicic acid and carbon black; fillers such as calcium carbonate, magnesium carbonate, diatomaceous earth, calcined clay, clay, talc, titanium oxide, bentonite, organic bentonite, ferric oxide, zinc oxide, active zinc white, hydrogenated castor oil and "shirasu" balloons; and fibrous fillers such as asbestos, glass fibers and filaments.

For obtaining cured compositions affording high strength using such fillers, a filler selected from among fumed silica, precipitated silica, anhydrous silicic acid, hydrous silicic acid, carbon black, surface-treated finely divided calcium carbonate, calcined clay, clay, active zinc white and the like is used in the main in an amount within the range of 1 to 100 parts per 100 parts of the reactive silicon group-containing oxypropylene polymer to give favorable results. For obtaining cured compositions affording low strength and high elongation, a filler selected from among titanium oxide, calcium carbonate, magnesium carbonate, talc, ferric oxide, zinc oxide, "shirasu" balloons and the like is used in the main in an amount within the range of 5 to 200 parts per 100 parts of the reactive silicon group-containing oxypropylene polymer to give favorable results. Of course, these fillers may be used either alone or in combination as a mixture of two or more of them.

The curable composition of the invention is more effective since the elongation of the cured product can be increased by combined use of a plasticizer and a filler or a large amount of filler incorporated therein. Usable as the plasticizer are phthalate esters, such as dioctyl phthalate, dibutyl phthalate and butyl benzyl phthalate; aliphatic dibasic acid esters, such as dioctyl adipate, isodecyl succinate and dibutyl sebacate; glycol esters, such as diethylene glycol dibenzoate and pentaerythritol esters; aliphatic esters, such as butyl oleate and methyl acetylricinoleate; phosphate esters, such as tricresyl phosphate, trioctyl phosphate and octyl diphenyl phosphate; epoxy plasticizers, such as epoxidized soybean oil, epoxidized linseed oil, benzyl epoxystearate, di-(2-ethylhexyl)-4,5-epoxycyclohexane-1, 2-dicarboxylate (EPS) epoxyoctyl stearate and epoxybutyl stearate; polyester plasticizers, such as polyesters from a dibasic acid and a dihydric alcohol; polyethers, such as polypropylene glycol and derivatives thereof; polystyrenes, such as poly-α-methyl-styrene and polystyrene; polybutadiene, butadiene-acrylonitrile copolymer, polychloroprene, polyisoprene, polybutene, chlorinated paraffin, and so on. These may be used either singly or in the form of an appropriate mixture of two or more of them. When the plasticizer is used in an amount within the range of 0 to 100 parts per 100 parts of the reactive silicon group-containing oxypropylene polymer, favorable results are obtained. Among the plasticizers specifically mentioned above, an epoxy plasticizer, for example EPS, when used alone or in admixture with another plasticizer, produces an increased effect on resilience.

The method of preparing the curable composition of the invention is not particularly limited but any conventional method can be employed: for example, the components mentioned above are combined and kneaded up in a mixer, roller or kneader at ambient temperature or under heating, or the components are dissolved in a small amount of an appropriate solvent to attain admixing. Furthermore, it is also possible to prepare one-can or two-can formulas by appropriately combining those components.

The curable composition according to the invention, when exposed to air, hence to moisture, three-dimensionally forms a network and hardens to a solid having rubber-like elasticity.

In using the curable composition of the invention, various additives, such as other curing catalysts, adhesion improvers, physical property modifiers, storage stability improvers, antioxidants, ultraviolet absorbers, metal inactivators, antiozonants, light stabilizers, amine type radical chain inhibitors, phosphorus-containing peroxide decomposing agents, lubricants, pigments, blowing agents, etc., may be added to the composition as necessary each in an appropriate amount.

For further illustrating the invention, the following examples are given.

Synthesis Example 1

A 1.5-liter pressure-resistant glass reaction vessel was charged with 401 g (0.081 equivalent) of polyoxypropylene triol having a molecular weight of 15,000 (Mw/Mn = 1.38, viscosity = 89 poise) and the contents were placed in a nitrogen atmosphere.

At 137° C., 19.1 g (0.099 equivalent) of a 28% solution of sodium methoxide in methanol was added dropwise from a dropping funnel, then the reaction was conducted for 5 hours and thereafter the reaction mixture was placed under reduced pressure for volatile matter removal. Again in a nitrogen atmosphere, 9.0 g (0.118 equivalent) of allyl chloride was added dropwise, the reaction was conducted for 1.5 hours and then the allylation was further carried out using 5.6 g (0.029 equivalent) of a 28% solution of sodium methoxide in methanol and 2.7 g (0.035 equivalent) of allyl chloride.

The reaction product was dissolved in hexane and subjected to adsorption treatment with aluminum silicate. The subsequent removal of the hexane under reduced pressure gave 311 g of a yellow and transparent b polymer (viscosity= 68 poise).

A pressure-resistant glass reaction vessel was charged with 270 g (0.065 equivalent) of this polymer and the contents were placed in a nitrogen atmosphere. A chloroplatinic acid catalyst solution (prepared by dissolving 25 g of $H_2PtCl_6.6H_2O$ in 500 g of isopropyl alcohol; 0.075 ml) was added and the mixture was stirred for 30 minutes. Dimethoxymethylsilane (6.24 g, 0.059 equivalent) was added from a dropping funnel and the reaction was conducted at 90° C. for 4 hours. The subsequent volatile matter removal yielded 260 g of a yellow and transparent polymer.

Synthesis Example 2

A flask equipped with a stirrer was charged with 220 g (0.0447 equivalent) of polyoxypropylene triol having a number average molecular weight of 15,000 (Mw/Mn= 1.38, viscosity= 89 poise) and 0.02 g of dibutyltin dilaurate and, in a nitrogen atmosphere, 8.45 (0.0447 equivalent) of γ-isocyanatopropylmethyldimethoxysilane was added dropwise at room temperature. After completion of the dropping, the reaction was conducted at 75° C. for 1.5 hours. IR spectrum measurement was performed and, after confirmation of the disappearance of the NCO absorption at about 2280 $cm^{-1}$ and of the formation of a C=O absorption at about 1730 $cm^{-1}$, the reaction was discontinued. A colorless and transparent polymer (213 g) was obtained.

Comparative Synthesis Example 1

A pressure-resistant glass reaction vessel was charged, after nitrogen substitution, with 420 g of polyoxypropylene glycol having a number average molecular weight of 3,000 and 80 g of polyoxypropylene triol having a number average molecular weight of 3,000. After addition of 40 g of sodium hydroxide, the reaction was carried out at 60° C. for 13 hours, then 19 g of bromochloromethane was added and further reaction was conducted at 60° C. for 10 hours. (The polymer thus obtained had an Mw/Mn of 2.1 and a viscosity of 385 poise.)

Then, 15 g of allyl chloride was added and the reaction was conducted for 36 hours. After completion of the reaction, the volatile matter was removed under reduced pressure.

The contents were transferred to a beaker, dissolved in hexane, and subjected to adsorption treatment with aluminum silicate, followed by removal of the hexane under reduced pressure.

A reaction vessel was charged, after nitrogen substitution, with 500 g of the polymer, then 0.03 g of a chloroplatinic acid catalyst solution (prepared by dissolving 25 g of $H_2PtCl_6 \cdot 6H_2O$ in 500 g of isopropyl alcohol) was added, thereafter 12 g of dimethoxymethylsilicane was added, and the reaction was carried out at 80° C. for 4 hours. After completion of the reaction, the volatile matter was removed under reduced pressure, whereupon 550 g of a pale-yellow, transparent polymer was obtained.

The viscosity of each of the polymers obtained in Synthesis Examples 1 and 2 and Comparative Synthesis Example 1 was determined at 23° C. using a type B viscometer (BM type rotar No. 4, 12 rpm). Each polymer was also analyzed for number average molecular weight (Mn) and molecular weight distribution (Mw/Mn) by GPC. The GPC was performed at an oven temperature of 40° C. using a column packed with a polystyrene gel (Tosoh Corporation) and tetrahydrofuran as the eluent. The results are shown in Table 1.

TABLE 1

| Polymer | Viscosity (poise) | Number average molecular weight (Mn) | Molecular weight distribution (Mw/Mn) |
|---|---|---|---|
| Synthesis Example 1 | 88 | $1.8 \times 10^4$ | 1.5 |
| Synthesis Example 2 | 150 | $1.7 \times 10^4$ | 1.4 |
| Comparative Synthesis Example 1 | 380 | $1.8 \times 10^4$ | 2.3 |

EXAMPLE 1

Comparative Example 1

To 100 parts of the polymer obtained in Synthesis Example 1 or Comparative Synthesis Example 1 were added 155 parts of colloidal calcium carbonate (Shiraishi Kogyo Kabushiki Kaisha, traden "Hakuenka CCR"), 45 parts of dioctyl phthalate, 20 parts of an epoxy plasticizer (Shin-Nippon Rika Kabushiki Kaisha, "Sansocizer E-PS"), 5 parts of an antioxidant and 5 parts of titanium dioxide (Ishihara Sangyo Kabushiki Kaisha, trade name "R-820"). The mixture was thoroughly kneaded on a three-roll paint roll mill, then 3 parts of stannous octanoate and 0.5 part of laurylamine were added as curing catalysts, and the whole was uniformly kneaded. Of the compositions obtained, the composition of Example 1 (in which the polymer of Synthesis Example 1 was used) had a lower viscosity and was easier to handle as compared with the composition of Comparative Example 1 (in which the polymer of Comparative Synthesis Example 1 was used).

H-shaped test pieces were prepared according to JIS A 5758 using these compositions together with aluminum plates (as adherends) and No. 40 (The Yokohama Rubber Co., Ltd.) (as a primer). After 4 days of curing at 23° C. and 1 day of curing at 50° C., the test pieces were compressed by 30% at 23° C. for 1 day. One day after release from the compression, the size of each test piece was measured using a micrometer and the percent restoration after compression (resilience) was calculated as follows:

$$\text{Restoration after compression } (\%) = \frac{(b - G) - 9.6}{(a - G) - 9.6} \times 100$$

b=thickness after compression
a=thickness before compression ($\approx$12.0–12.5 mm)
G=thickness of adherends (for two plates)
The results are shown in Table 2.

TABLE 2

| | Polymer used | Resilience (%) |
|---|---|---|
| Example 1 | Synthesis Example 1 | 16 |
| Comparative Example 1 | Comparative Synthesis Example 1 | 10 |

EXAMPLE 2

The polymer obtained in Synthesis Example 2 was used in lieu of the polymer obtained in Synthesis Example 1 and the percent size restoration was determined in the same manner as in Example 1. The result obtained was similar to that obtained in Example 1.

The composition of the invention gives cured products superior in resilience or size restoration as compared with compositions in which a polymer showing a broad molecular weight distribution is used as component (A).

The reactive silicon group-containing oxypropylene polymer to be used as component (A) in the curable composition of the invention has a narrow molecular weight distribution despite its high number average molecular weight. Therefore, before curing, the composition of the invention is lower in viscosity and easier to handle than compositions containing the conventional reactive silicon group-containing oxypropylene polymers having the same molecular weight but showing a broader molecular weight distribution.

The low viscosity before curing as mentioned above not only improves processability but also enables incorporation of a large amount of filler to give an excellent room temperature curable composition.

The curable composition of the invention is particularly useful as an elastic sealant and can be used as a sealant for buildings, ships, automobiles, roads, and so forth. Furthermore, the composition, either as such or with the aid of a primer, can closely adhere to a wide variety of substances, such as glass, ceramics, wood, metals and resin moldings and therefore can be used as various types of sealing compositions, or adhesive compositions. Furthermore, it is useful also as a food packaging material, a rubber material for casting, a material for templating or a paint.

What is claimed is:

1. A curable composition comprising:

(A) an oxypropylene polymer containing, in its main polymer chain, a repeating unit of the formula

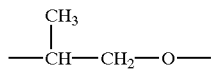

having at least one silicon atom-containing group with a hydroxyl group or a hydrolyzable group bound to the silicon atom and an Mw/Mn ratio of not more than 1.6 and a number average molecular weight of not less than 6,000, (B) an organic carboxylic acid salt of divalent tin, and (C) an organic amine compound.

2. A curable composition as claimed in claim 1, wherein the component (A) polymer has an Mw/Mn ratio of not more than 1.5.

3. A curable composition as claimed in claim 1, wherein the component (A) polymer has a number average molecular weight of 6,000 to 30,000.

4. A curable composition as claimed in claim 1, wherein the silicon atom-containing group occurs at a terminal of the molecular chain.

5. A curable composition as claimed in claim 2, wherein the component (A) polymer has a number average molecular weight of 6,000 to 30,000.

6. A curable composition as claimed in claim 2, wherein the silicon atom-containing group occurs at a terminal of the molecular chain.

7. A curable composition as claimed in claim 3, wherein the silicon atom-containing group occurs at a terminal of the molecular chain.

8. A curable composition as claimed in claim 1, further comprising:

(D) an epoxy plasticizer or a mixture of an epoxy plasticizer with another plasticizer.

9. A curable composition as claimed in claim 1, wherein the component (A) polymer has an Mw/Mn ratio of not more than 1.4.

10. A curable composition comprising:

(A) an oxypropylene polymer containing, in its main polymer chain, a repeating unit of the formula

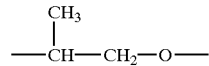

having at least one silicon atom-containing group with a hydroxyl group or a hydrolyzable group bound to the silicon atom and an Mw/Mn ratio of not more than 1.6 and a number average molecular weight of not less than 6,000, (B) an organic carboxylic acid salt of divalent tin, and (C) laurylamine.

11. A curable composition as claimed in claim 10, wherein the component (B) organic carboxylic acid salt of divalent tin is tin (II) octanoate.

* * * * *